United States Patent
Searcy

(10) Patent No.: US 9,588,682 B2
(45) Date of Patent: Mar. 7, 2017

(54) THUMB OPERATED KEYBOARD DEVICE

(71) Applicant: Chris Searcy, Espanola, NM (US)

(72) Inventor: Chris Searcy, Espanola, NM (US)

( * ) Notice: Subject to any disclaimer, the term of this patent is extended or adjusted under 35 U.S.C. 154(b) by 112 days.

(21) Appl. No.: 14/614,654

(22) Filed: Feb. 5, 2015

(65) Prior Publication Data

US 2016/0231926 A1 Aug. 11, 2016

(51) Int. Cl.
G06F 3/048 (2013.01)
G06F 3/0488 (2013.01)
H04M 1/725 (2006.01)
G06F 1/16 (2006.01)
G06F 3/02 (2006.01)
H04M 1/02 (2006.01)
H04M 1/23 (2006.01)

(52) U.S. Cl.
CPC ........ G06F 3/04886 (2013.01); G06F 1/1633 (2013.01); G06F 3/0219 (2013.01); H04M 1/0279 (2013.01); H04M 1/23 (2013.01); H04M 1/72547 (2013.01); H04M 1/72569 (2013.01); H04M 2250/22 (2013.01)

(58) Field of Classification Search
CPC combination set(s) only.
See application file for complete search history.

(56) References Cited

U.S. PATENT DOCUMENTS

| 7,336,979 | B2 | 2/2008 | Soejima |
| 2008/0040527 | A1 | 2/2008 | Filipov et al. |
| 2008/0120448 | A1 | 5/2008 | Shi et al. |
| 2008/0246731 | A1 | 10/2008 | Chechelniker |
| 2012/0149433 | A1 | 6/2012 | Huang et al. |
| 2012/0240161 | A1 | 9/2012 | Kuo |
| 2013/0013904 | A1 | 1/2013 | Tran |
| 2013/0120258 | A1 | 5/2013 | Maus |
| 2013/0203473 | A1 | 8/2013 | Kota |
| 2015/0293607 | A1* | 10/2015 | Wu ........................ G06F 3/0235 345/169 |

FOREIGN PATENT DOCUMENTS

WO  WO2008021640  2/2008

* cited by examiner

*Primary Examiner* — Van Chow

(57) ABSTRACT

A thumb operated keyboard device provides a keyboard which can be held such that a user's thumbs are free and positioned to manipulate keys on the keyboard. The device includes a rectangular panel. Each of a plurality of keys is positioned on a front face of the panel. The panel is configured for operationally coupling to a computer such that the computer receives input from manipulation of the keys on the panel. Each of a plurality of pads is coupled to a peripheral edge of the panel. Each of the pads is positioned to extend around an associated corner of the panel to abut a user's fingers such that the panel is holdable in a stable position with the user's thumbs positioned proximate the front face to manipulate the keys. Alternatively, projections extend from a back face of the panel to facilitate holding the panel.

13 Claims, 3 Drawing Sheets

THUMB OPERATED KEYBOARD DEVICE

BACKGROUND OF THE DISCLOSURE

Field of the Disclosure

The disclosure relates to keyboard devices and more particularly pertains to a new keyboard device for providing a keyboard which can be held such that a user's thumbs are free and positioned to manipulate keys on the keyboard.

SUMMARY OF THE DISCLOSURE

An embodiment of the disclosure meets the needs presented above by generally comprising a rectangular panel. Each of a plurality of keys is positioned on a front face of the panel. The panel is configured for operationally coupling to a computer such that the computer receives input from manipulation of the keys on the panel. Each of a plurality of pads is coupled to a peripheral edge of the panel. Each of the pads is positioned to extend around an associated corner of the panel to abut a user's fingers such that the panel is holdable in a stable position with the user's thumbs positioned proximate the front face to manipulate the keys. Alternatively, projections extend from a back face of the panel to facilitate holding the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
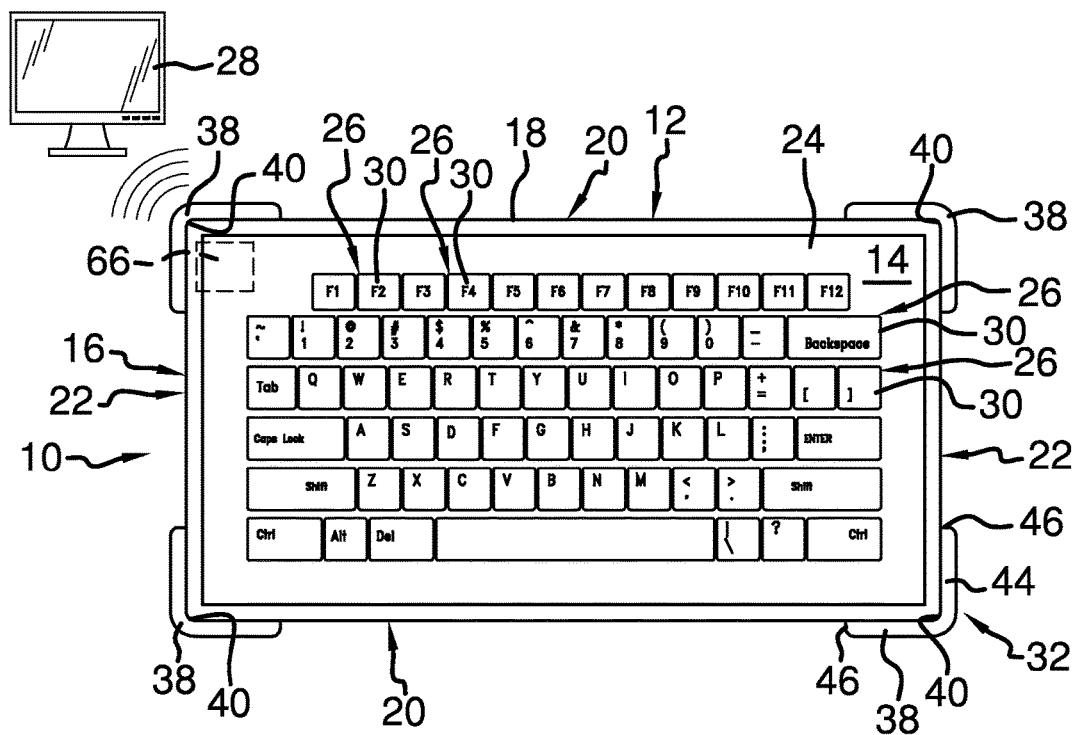
FIG. 1 is a front view of a thumb operated keyboard device according to an embodiment of the disclosure.
Figure 2:
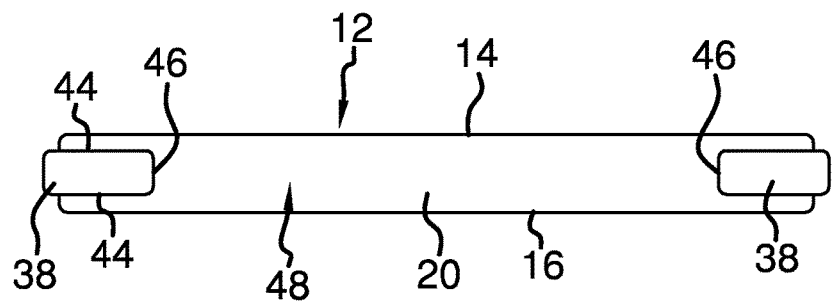
FIG. 2 is a bottom view of an embodiment of the disclosure.
Figure 3:
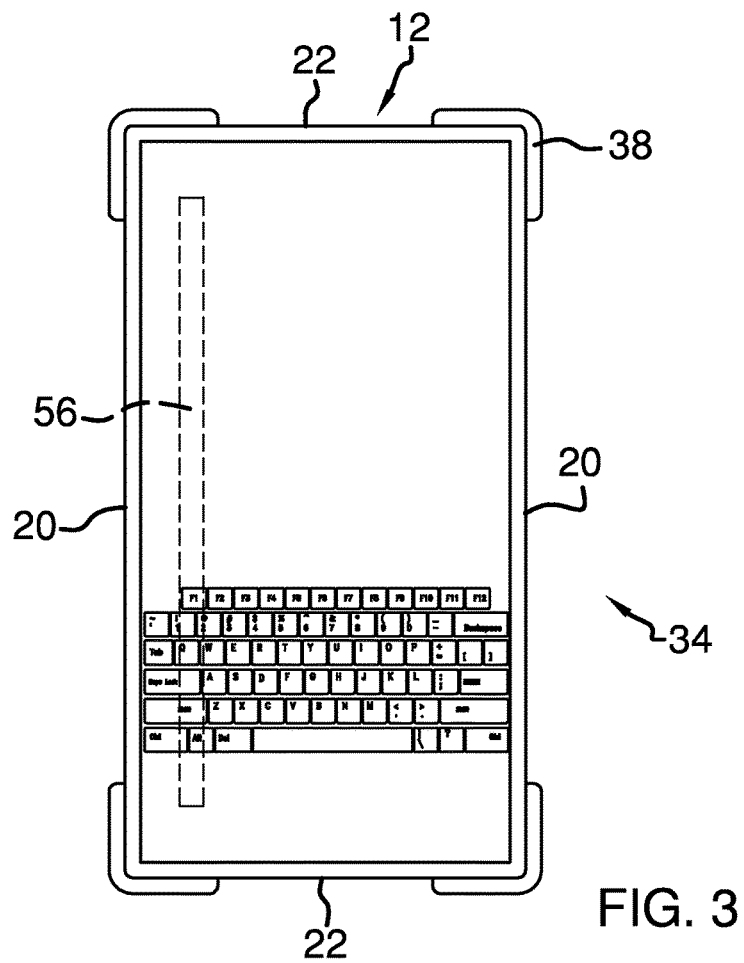
FIG. 3 is a front view of an embodiment of the disclosure.
Figure 4:
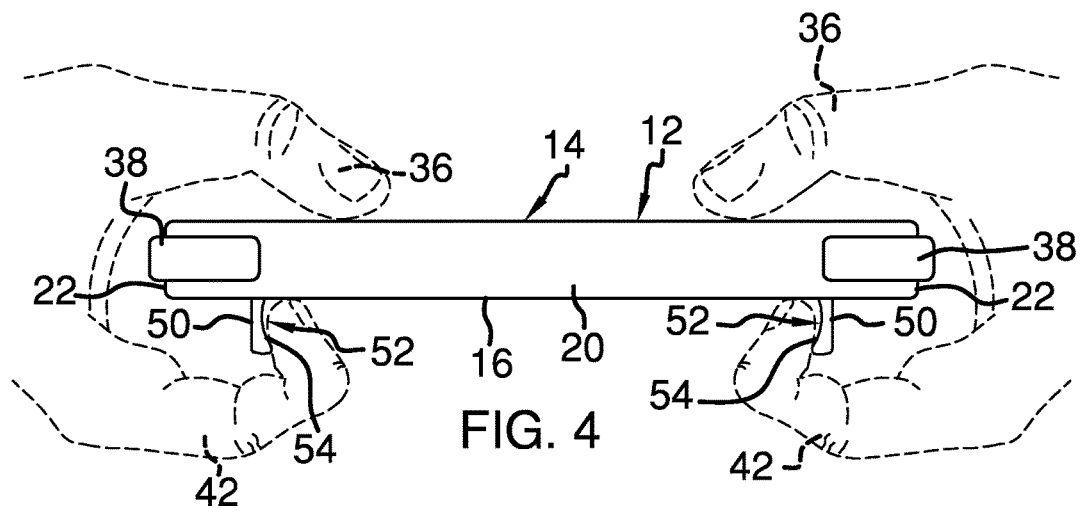
FIG. 4 is a top view of an embodiment of the disclosure.
Figure 5:
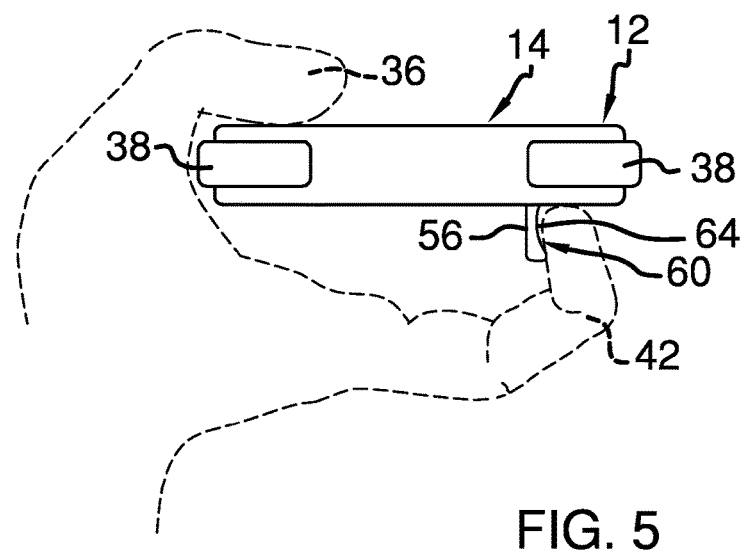
FIG. 5 is a side view of an embodiment of the disclosure.
Figure 6:
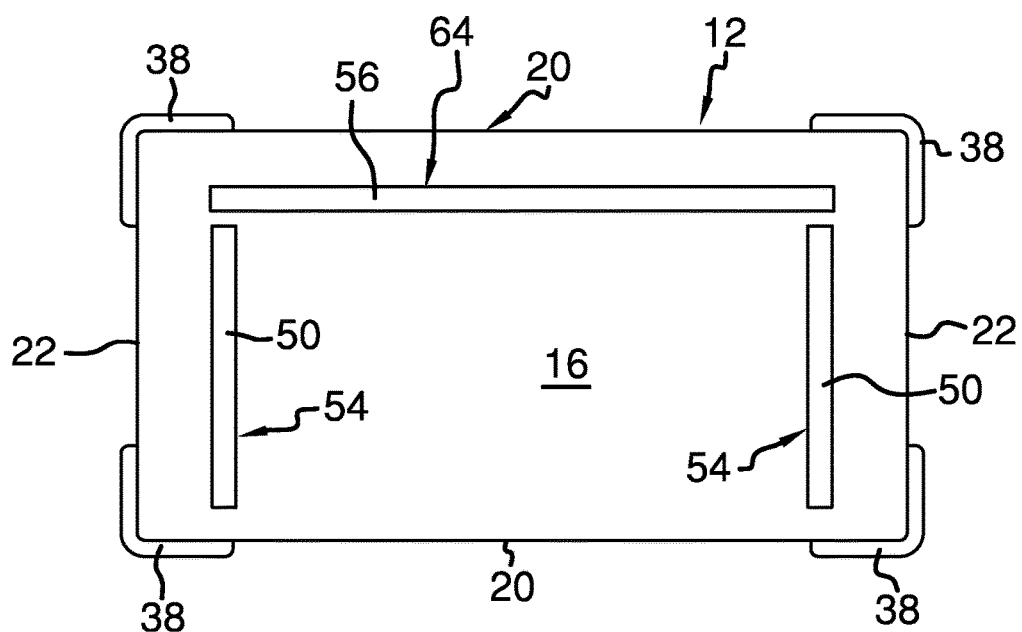
FIG. 6 is a back view of an embodiment of the disclosure.

With reference now to the drawings, and in particular to FIGS. 1 through 6 thereof, a new keyboard device embodying the principles and concepts of an embodiment of the disclosure and generally designated by the reference numeral 10 will be described.

As best illustrated in FIGS. 1 through 6, the thumb operated keyboard device 10 generally comprises a rectangular panel 12 having a front face 14, a back face 16, and a peripheral edge 18 extending around and between the front face 14 and the back face 16. The peripheral edge 18 of the panel 12 has a pair of longitudinal sides 20 and a pair of end sides 22. Each of a plurality of keys 26 is positioned on the front face 14 of the panel 12. The panel 12 is configured for operationally coupling to a computer 28 such that the computer 28 receives input from manipulation of the keys 26 on the panel 12. Each of the keys 26 may be a button icon 30 positioned on the touchscreen 24. The keys 26 are arranged into a qwerty configuration. The keys 26 may be conventional physical buttons positioned on the front face 14. Alternatively, the front face 14 may comprise a touchscreen 24. The touchscreen 24 adjusts orientation of the button icons 30 to maintain the qwerty configuration in an upright orientation as the panel 12 is moved between a landscape orientation 32 and a portrait orientation 34 of the panel 12. The panel 12 is sized to allow for single handed grasping and manipulation of the keys 26 when the panel 12 is held in the portrait orientation 34. The panel 12 is further sized to allow for two handed grasping and manipulation of the keys 26 by both thumbs 36 of a user.

Each of a plurality of pads 38 may be coupled to the peripheral edge 18 of the panel 12. Each of the pads 38 is rectangular and positioned to extend around an associated corner 40 of the panel 12 wherein the pads 38 are configured for abutting a user's fingers 42 such that the panel 12 is holdable in a stable position with at least one of the user's thumbs 36 positioned proximate the front face 14 to manipulate the keys 26. Each pad 38 has a perimeter edge 44 which is offset on the peripheral edge 18 of the panel 12 from the front face 14 and the back face 16. Ends 46 of adjacently positioned pads 38 around the peripheral edge 18 are spaced apart providing gaps 48 between the pads 38.

Each of a pair of projections 50 may be provided. Each projection 50 extends outwardly from the back face 16 of the panel 12. Each of the projections 50 is positioned proximate an associated one of the end sides 22 of the peripheral edge 18. Each projection 50 is elongated and may include a concave groove 52 extending along an inner face 54 of the projection 50. Thus, each projection 50 is configured for being engaged by a middle finger of the user to facilitate extending the thumb 36 of the user inwardly towards a middle of the front face 14 of the panel 12. Similarly, a grip 56 may be coupled to the back face 16 such that the grip 56 extends outwardly from the back face 16 in spaced relationship to one of the longitudinal sides 20 of the peripheral edge 18. The grip 56 may also have a concavity 60 on an outer face 64 to facilitate engagement of the grip 56 by fingers of the user. The grip is positioned in spaced relationship, but proximate to, one of the longitudinal sides 20 of the peripheral edge 18 such that the user can hold the panel 12 by grasping the grip 56 to extend a reach of the thumb 36 over a second one of the longitudinal sides 20 of the peripheral edge 18 of the panel 12 when the panel 12 is held and used in the portrait orientation 34.

A transmitter 66 may be coupled to the panel 12 such that the panel 12 is configured for wireless operational coupling to the computer 28 using internet, local access networking, wireless universal serial bus connector, or the like. The panel 12 may also be provided with a physical connection of a conventional type such as through a universal serial bus wired connection.

In use, the device 10 functions as a conventional keyboard but is sized and configured to facilitate operation of the keys 26 by a user's thumb or thumbs to control a conventional desktop computer. Thus, a user may learn and perform keyboard inputting in a single technique consistent with texting on smaller devices instead of learning the traditional typewriter style keyboard manipulation required with conventional keyboards.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A thumb operable keyboard device comprising:
   a rectangular panel having a front face, a back face, and a peripheral edge extending around and between said front face and said back face;
   a plurality of keys positioned on said front face of said panel, said panel being configured for operationally coupling to a computer such that the computer receives input from manipulation of said keys on said panel; and
   a plurality of pads, each of said pads being coupled to said peripheral edge of said panel, each of said pads being positioned to extend around an associated corner of said panel wherein said pads are configured for abutting a user's fingers such that said panel is holdable in a stable position with the user's thumbs positioned proximate said front face to manipulate said keys;
   said peripheral edge of said panel having a pair of longitudinal sides and a pair of end sides; and
   a pair of projections, each of said projections extending outwardly from said back face of said panel, each of said projections being positioned proximate an associated one of said end sides of said peripheral edge wherein each said projection is configured for being engaged by a middle finger of the user to facilitate extending the thumb of the user inwardly towards a middle of said front face of said panel.

2. The device of claim 1, further comprising said front face comprising a touchscreen.

3. The device of claim 2, further comprising each of said keys being a button icon positioned on said touchscreen.

4. The device of claim 1, further comprising said plurality of keys being arranged into a qwerty configuration.

5. The device of claim 3, further comprising said touchscreen adjusting orientation of said button icons as said panel is moved between a landscape orientation and a portrait orientation of said panel.

6. The device of claim 1, further comprising a transmitter coupled to said panel wherein said panel is configured for wireless operational coupling to the computer.

7. A thumb operable keyboard device comprising:
   a rectangular panel having a front face, a back face, and a peripheral edge extending around and between said front face and said back face, said peripheral edge of said panel having a pair of longitudinal sides and a pair of end sides;
   a plurality of keys positioned on said front face of said panel, said panel being configured for operationally coupling to a computer such that the computer receives input from manipulation of said keys on said panel; and
   a pair of projections, each of said projections extending outwardly from said back face of said panel, each of said projections being positioned proximate an associated one of said end sides of said peripheral edge wherein each said projection is configured for being engaged by a middle finger of the user to facilitate extending the thumb of the user inwardly towards a middle of said front face of said panel.

8. The device of claim 7, further comprising said front face comprising a touchscreen.

9. The device of claim 8, further comprising each of said keys being a button icon positioned on said touchscreen.

10. The device of claim 7, further comprising said plurality of keys being arranged into a qwerty configuration.

11. The device of claim 9, further comprising said touchscreen adjusting orientation of said button icons as said panel is moved between a landscape orientation and a portrait orientation of said panel.

12. The device of claim 7, further comprising a transmitter coupled to said panel wherein said panel is configured for wireless operational coupling to the computer.

13. A thumb operable keyboard device comprising:
   a rectangular panel having a front face, a back face, and a peripheral edge extending around and between said front face and said back face, said peripheral edge of said panel having a pair of longitudinal sides and a pair of end sides, said front face comprising a touchscreen;
   a plurality of keys positioned on said front face of said panel, said panel being configured for operationally coupling to a computer such that the computer receives input from manipulation of said keys on said panel, each of said keys being a button icon positioned on said touchscreen, said plurality of keys being arranged into a qwerty configuration, said touchscreen adjusting orientation of said button icons as said panel is moved between a landscape orientation and a portrait orientation of said panel;
   a plurality of pads, each of said pads being coupled to said peripheral edge of said panel, each of said pads being positioned to extend around an associated corner of said panel wherein said pads are configured for abutting a user's fingers such that said panel is holdable in a stable position with the user's thumbs positioned proximate said front face to manipulate said keys;
   a pair of projections, each of said projections extending outwardly from said back face of said panel, each of said projections being positioned proximate an associated one of said end sides of said peripheral edge wherein each said projection is configured for being engaged by a middle finger of the user to facilitate extending the thumb of the user inwardly towards a middle of said front face of said panel; and
   a transmitter coupled to said panel wherein said panel is configured for wireless operational coupling to the computer.

* * * * *